United States Patent [19]

Greene et al.

[11] Patent Number: 4,731,435

[45] Date of Patent: Mar. 15, 1988

[54] ELASTOMERS

[75] Inventors: Robin N. Greene; Garret D. Figuly, both of Wilmington, Del.

[73] Assignee: E. I. Du Pont de Nemours and Company, Wilmington, Del.

[21] Appl. No.: 929,087

[22] Filed: Nov. 10, 1986

[51] Int. Cl.$^4$ .................. C08G 69/44; C08G 73/16
[52] U.S. Cl. ................... 528/289; 525/425; 525/432; 528/274; 528/288
[58] Field of Search .............. 528/274, 288–289, 528/292; 525/432, 425

[56] References Cited

U.S. PATENT DOCUMENTS

| 4,205,158 | 5/1980 | Hoeschele | 528/300 |
| 4,371,692 | 2/1983 | Wolfe, Jr. | 528/289 |
| 4,371,693 | 2/1983 | Wolfe | 528/292 |
| 4,436,896 | 3/1984 | Okamoto et al. | 156/332 |
| 4,438,240 | 3/1984 | Tanaka et al. | 525/420 |
| 4,467,595 | 8/1984 | Kramers | 57/225 |
| 4,544,734 | 10/1985 | McCready | 528/288 |
| 4,556,688 | 12/1985 | McCready et al. | 525/33 |
| 4,556,705 | 12/1985 | McCready | 528/289 |
| 4,565,849 | 1/1986 | Horikawa et al. | 525/420 |

FOREIGN PATENT DOCUMENTS

| 84109054.1 | 2/1985 | European Pat. Off. |
| 44-20477 | 9/1969 | Japan . |
| 44-20478 | 9/1969 | Japan . |
| 44-30751 | 12/1969 | Japan . |
| 45-2193 | 1/1970 | Japan . |
| 45-9193 | 1/1970 | Japan . |
| 45-2192 | 1/1970 | Japan . |

OTHER PUBLICATIONS

Makromol Chem. 179, 1955–1959, (1978).

Primary Examiner—Lucille M. Phynes

[57] ABSTRACT

Elastomers are prepared from high molecular weight relatively rigid difunctional compounds and low molecular weight aliphatic compounds selected from diacids, diols, diamines, hydroxyacids and aminoacids.

17 Claims, No Drawings

ELASTOMERS

BACKGROUND OF THE INVENTION

1. Field of the Invention

This invention provides novel elastomeric polymers from certain high molecular weight relatively rigid difunctional compounds and certain low molecular weight difunctional aliphatic compounds. These elastomers are useful for fibers, films or molded products.

2. Description of the Prior Art

It is known from the prior art to produce elastomers by polycondensation of diesters of high molecular weight relatively rigid dicarboxylic acids with poly-(alkylene oxide) glycol in substantially equimolar proportions. The present invention permits one to avoid the use of presynthesized macrodiol and to limit the amount of the expensive high molecular weight and relatively rigid component required to obtain elastomeric properties.

SUMMARY OF THE INVENTION

This invention provides an elastomer consisting essentially of

A. from about 5 to 25 wt. % of —X— units where —X— is part of a repeat unit having the structural formula

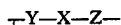

where —Y— and —Z— are independently selected from —O—,

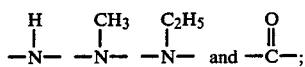

—X— is a divalent organic radical consisting of a chain of ring structures except for trans-amide, carbonyl, trans-vinylene, azo (i. e., —N═N—) and azomethine (i.e., —HC═N—) linkages which may be present and whose shortest length between centers of its terminal junctions measured from a Dreiding model laid flat is at least 11 Angstroms; and when —X— is in the compound:

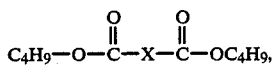

the compound exhibits a melting point that is at least about 225° C.; and

B. from about 75 to 95 wt. % of units selected from the following

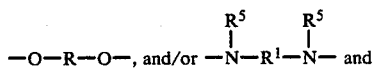

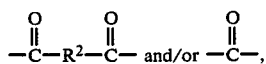

in which both free bonds are connected to oxygen and/or nitrogen, and/or

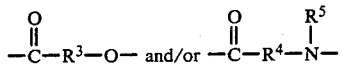

where R, R¹, R², R³ and R⁴ are each aliphatic divalent organic radicals, having from 2 to 15 carbon atoms within the chain, with each having a molecular weight of under 450 and R⁵ is a hydrocarbon radical. It will be understood, of course, that the polymer must be balanced stoichiometrically. Fibers, films, or molded articles from the polymers and processes for manufacture of the polymer are also comprehended.

DETAILED DESCRIPTION OF THE INVENTION

The novel polymer of this invention is an elastomer. By this is meant a polymer which, free of diluents, retracts to less than 1.5 times its original length within one minute after being stretched at room temperature to twice its length and held for one minute before release. This definition corresponds to that given in "ASTM D1566-83a" for a modified rubber. Polymers of the invention are useful in a number of end use applications. Hot melt adhesives, tubing and injection moldings and melt-spun elastic fibers are among such uses. The polymer should preferably have an inherent viscosity of at least 0.55 dL/g when measured as described below.

The polymer is basically comprised of two components, a "hard" segment and a "soft" segment. The "hard" segment corresponds to —X— in units having the formula —Y—X—Z—, the —X— units being present in the in an amount of from about 5 to 25% by weight. The groups —Y— and —Z— are independently selected from

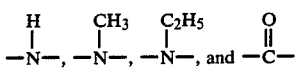

and are attached directly to —X—, or may be separated therefrom by spacer groups (not part of —X—) such as one or more methylene groups. The symbol —X— is a divalent radical whose shortest length between centers of its terminal junctions is at least 11 Angstroms as measured flat, or as flat as can be, with "Dreiding Models" which are constructed to be in precise scale to the actual inter-atomic distances. This technique is known in the prior art and is described in the article by Andre S. Dreiding, Helv. Chim. Acta 42, 1339 (1959). The Dreiding models can be conveniently constructed from units obtained from Brinkman Instruments Inc., Cantiague Road, Westbury, N.Y. The terminal junction is the ring carbon atom of —X— that is attached to the functional group —Y— or —Z— as shown in formula (I) below or any carbon of —X— that is attached to the —Y— or —Z— group, as shown in formula XI below.

Basically, —X— is a radical made up of a chain or backbone of ring structures except for trans-amide, carbonyl, trans-vinylene, azo or azomethine linkages which may be present. The ring structures, which may be, but preferably are not, substituted, include

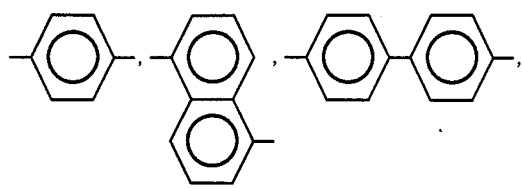

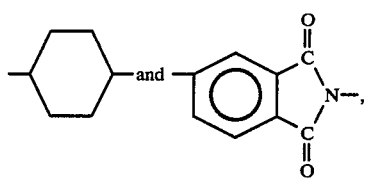

The "hard" segment is further characterized by the melting point of the dibutyl ester of the diacid $$HO-\overset{O}{\underset{}{C}}-X-\overset{O}{\underset{}{C}}-OH$$

where —X— is as defined above. The present invention requires this dibutyl ester to have a melting point of at least about 225° C. measured as described below.

Dibutyl esters are prepared in a manner apparent to those skilled in the art. For example, the dibutyl esters of bis-trimellitimides are prepared by reaction of two moles of the mono-butyl ester of trimellitic anhydride with one mole of the appropriate diamine. The mono-butyl ester of trimellitic anhydride is formed by reaction of one mole of trimellitic anhydride acid chloride with one mole of n-butanol.

Dibutyl esters of diacids based on the reaction of two moles of p-aminobenzoic acid and one mole of a dianhydride are made by reaction of two moles of the monobutyl ester of p-aminobenzoic acid and one mole of the dianhydride.

A number of —Y—X—Z— units are listed below as follows:

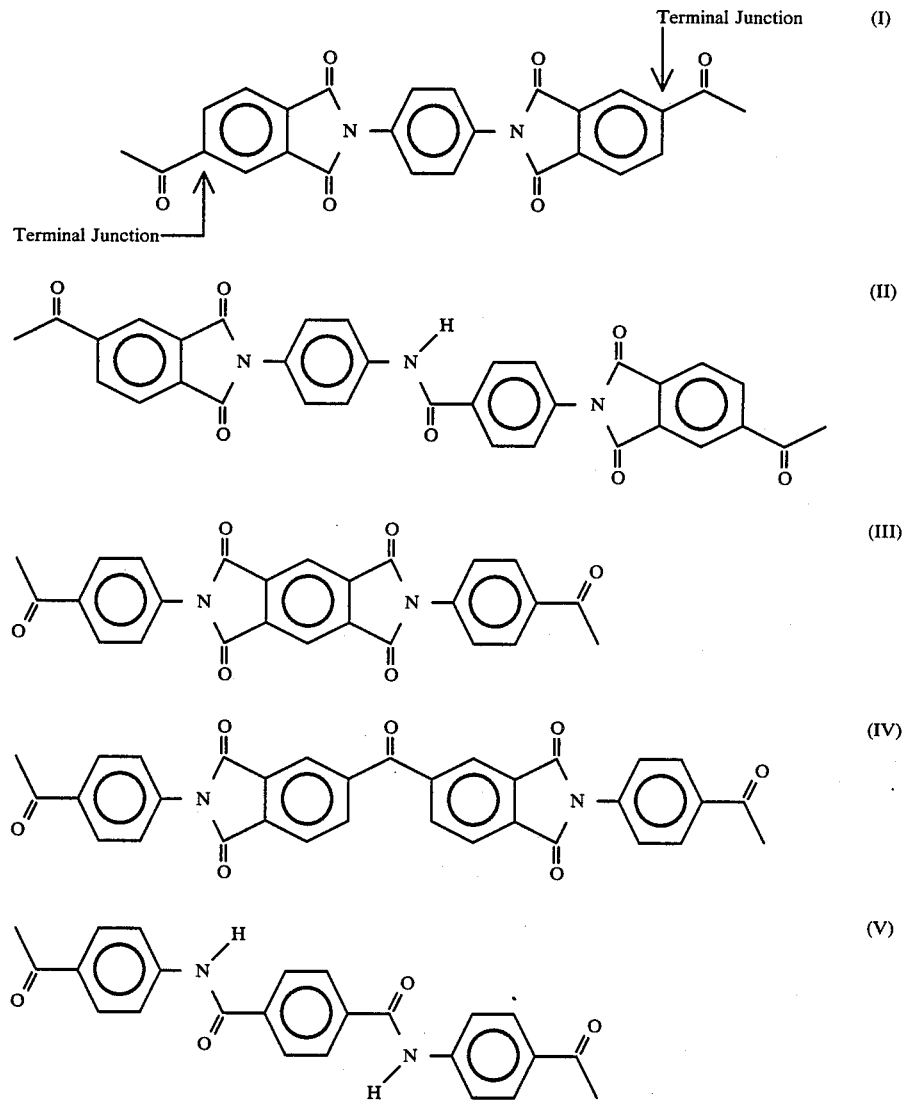

-continued
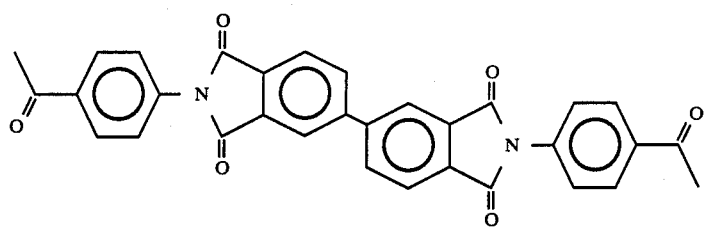
(VII)
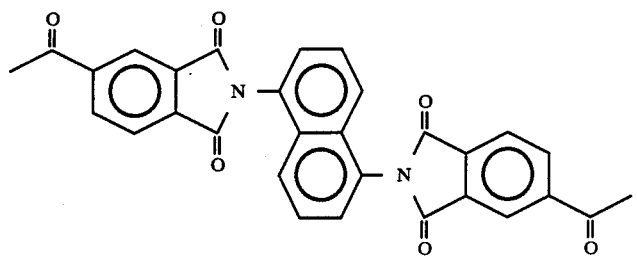
(VI)
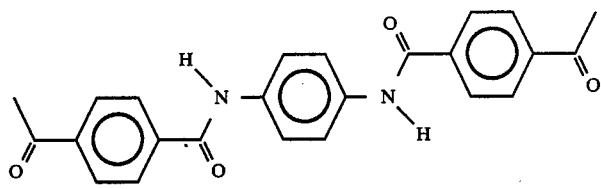
(VIII)
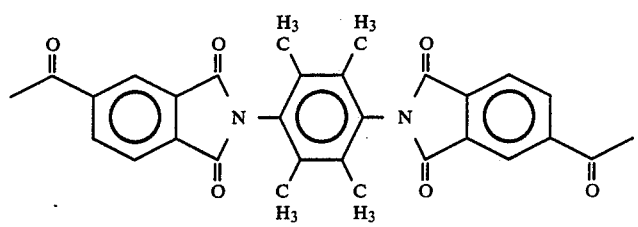
(IX)
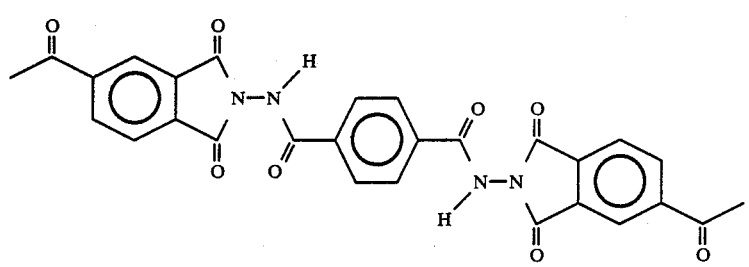
(X)
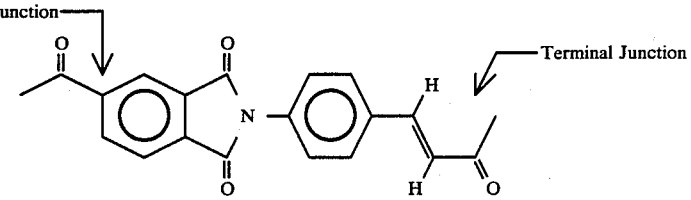
(XI)
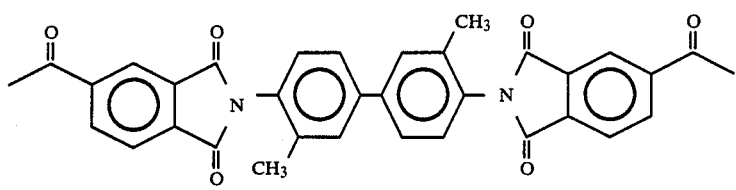
(XII)

-continued
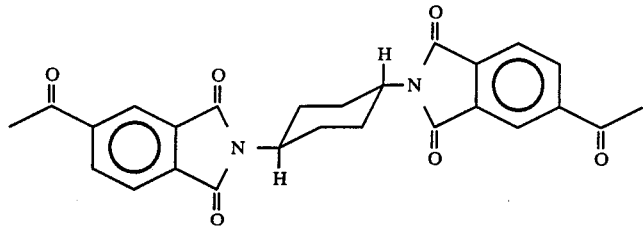
The following listing of units would also be expected to meet the requirements for the —Y—X—Z—
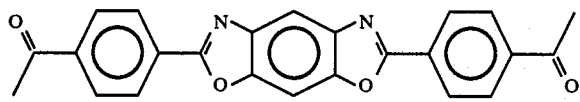
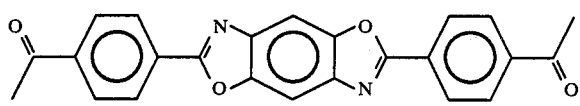
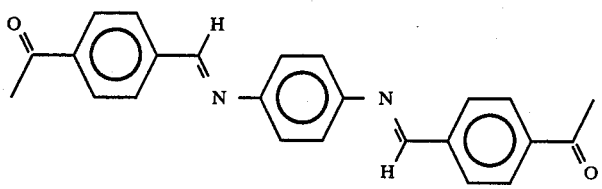
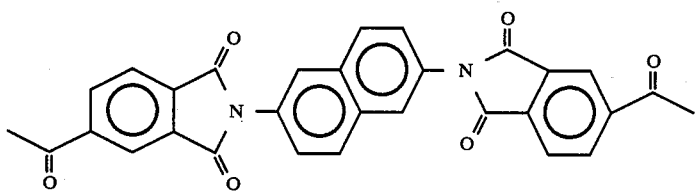
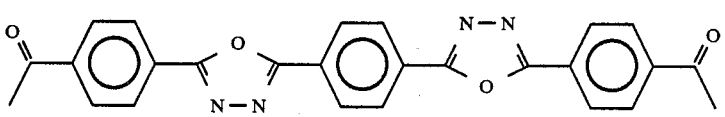
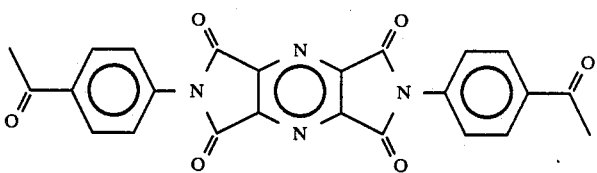
(XIII)
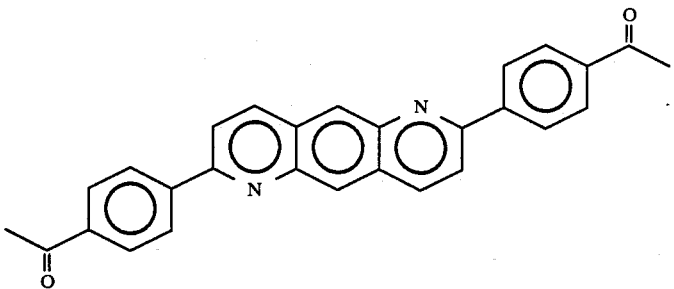

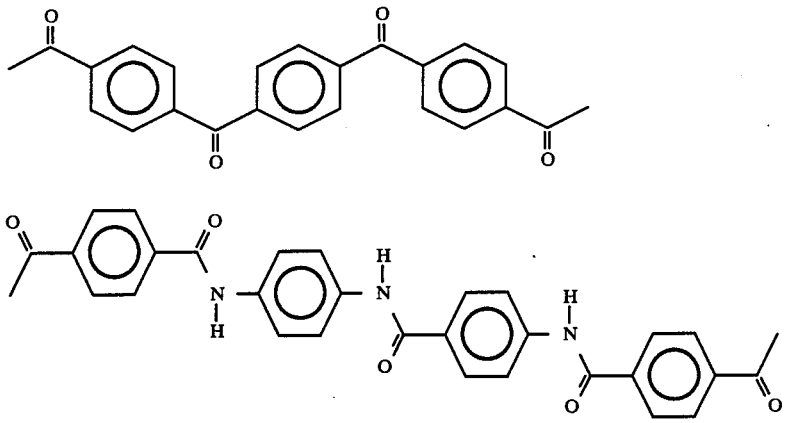

The —Y—X—Z— units are residues of diacids, diols, diamines, hydroxyacids and aminoacids. Such compounds and their preparation are described in the prior art or can be prepared by techniques well known to those skilled in the art. Preparation of —Y—X—Z— unit-providing compounds is illustrated in examples which follow. A preferred synthesis procedure involves making such compounds in a polymer reaction medium of ingredients which ultimately provides the soft segment of the polymer.

In the event an —Y—X—Z— unit in diacid or diol form has an undesirably high melting point which interferes with dissolution in the reaction medium, it may be employed or formed in the form of a more soluble derivative such as the diester in the case of the diacid. In syntheses where —X— contains a plurality of aromatic amide linkages there is a tendency for the hard segment to cleave. Care must be exercised to avoid scission under the polymerization conditions such as by use of less severe reaction conditions as by use of the aliphatic diacid(s) in the form of their dimethyl esters and by use of hindered aliphatic diol(s) such as neopentyl glycol or 1,2-propanediol.

The remainder of the elastomer composition, from about 75 to 95% by weight of the polymer, is the "soft" segment. The soft segment is substantially amorphous and it has a glass transition temperature below room temperature. Basically, it is an aliphatic polyester, an aliphatic poly-N-alkylamide or a copolymer containing components of each, i.e., both ester and amide components. The soft segment is made up of units selected from the following:

a. —O—R—O— and/or

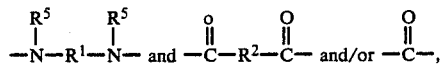

in which both free bonds are connected to oxygen and-
/or nitrogen, and/or

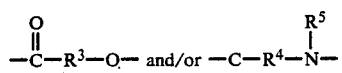

where R, $R^1$, $R^2$, $R^3$ and $R^4$ are each aliphatic divalent radicals having from 2 to 15 carbon atoms within the chain and a molecular weight of under 450. The term "aliphatic" is intended to include straight chain, branched chain and cycloaliphatic, as well as aliphatic which may be interrupted with —O—, —S—, tertiary nitrogen or may be substituted, as for example, with halogens. Preferably the aliphatic radical is a saturated hydrocarbon although small amounts of unsaturated units such as derived from 2-butene-1,4-diol or maleic acid are also permitted. $R^5$ is a hydrocarbon radical, preferably 1-6 carbon atom alykl or phenyl. As will be discussed, the "soft" segment may include minor amounts, i.e., less than about 20% by wt. of the soft segments, of units not conforming to these formulas such as units from hydroquinone, terephthalic acid or higher molecular weight macrodiols, such as polyalkylene ether glycols or macrodiacids, such as "dimer acid", the commercially available diacid obtained by coupling of two long chain unsaturated monocarboxylic fatty acids.

It will be understood that the polymer is stoichiometrically balanced by which is meant, for example, that the number of moles of unit a. is substantially equal to the moles of unit b. plus moles of —Y—X—Z— where both —Y— and —Z— are carbonyl groups, while the number of moles of unit b. is substantially equal to the moles of unit a. plus moles of —Y—X—Z— where both —Y— and —Z— are

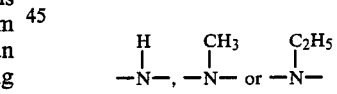

If —Y— is carbonyl and —Z— is

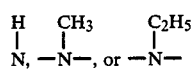

then the number of moles of unit a., if present, will be substantially equivalent to the number of moles of unit b.

The unit, —O—R—O—, is the residue of a low molecular weight aliphatic diol. Included among the diols useful in this invention are ethylene glycol, 1,2-propylene glycol, 1,3-propylene glycol, 1,2-, 1,3-, and 1,4-butylene glycol, 1,6-hexanediol, neopentyl glycol and diethylene glycol. Aliphatic diols having a tertiary nitrogen atom in the chain are also useful. Mixtures of the diols are often used with improved results. Minor amounts of aromatic diols may be included in a diol mixture provided they do not interfere with the desired elastomeric properties. In place of or in addition to the diols, low molecular weight diamines may be employed in the preparation of the polymer. The unit,

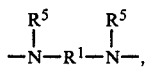

represents the residue of suitable low molecular weight aliphatic diamines. Included among such suitable compounds are N,N'-dibutylpentamethylenediamine and N,N'-dimethylhexamethylenediamine. The functional equivalents of the diols and diamines may be used in the preparation. Thus, for example, epoxides can be used in place of the dihydroxy compound which in the case of phenylglycidyl ether is 1,2-dihydroxy-3-phenoxypropane as equivalent ester-forming derivatives.

The unit

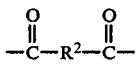

is the residue of an aliphatic dicarboxylic acid while unit

is the residue of carbonic acid. Included among the useful acids are succinic, glutaric, adipic, azelaic, carbonic and dodecanedioic acid as well as their functional equivalents such as the esters, acid halides and anhydrides thereof. Mixtures of acids may be used if desired. Aromatic dicarboxylic acids may be used only in minor amounts in admixture with the low molecular weight aliphatic dicarboxylic acids since larger amounts cause a substantial increase in the glass transition temperature, Tg, of the elastomer, impairing low temperature performance.

The unit,

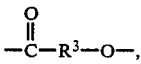

is the residue of an aliphatic hydroxyacid. Examples of such hydroxyacids include 12-hydroxystearic acid, 10-hydroxydecanoic acid and 4-hydroxycaproic acid as well as their functional equivalents, such as lactones. Mixtures of hydroxyacids may be used if desired. Hydroxyaromatic acids such as hydroxybenzoic acid may be used in minor amounts in admixture with the aliphatic hydroxyacids provided they do not interfere with the desired elastomeric properties. Similarly, the unit,

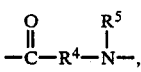

which is the residue of an aliphatic aminoacid may be present in place of or in addition to the

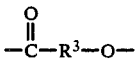

units. One such aminoacid is N-butyl-6-aminohexanoic acid. $R^5$ is as defined above.

Since it is desirable that the soft segment should be amorphous for best elastomer properties, one method to avoid crystallinity in the soft segment is to employ a mixture of aliphatic diols with one aliphatic diacid or a mixture of aliphatic diacids with one aliphatic diol. The use of N-alkyl groups in the amines is another technique illustrated herein.

It will be understood that the aforementioned units a., b. and c. of the soft segment may be supplied from polyester macromolecules which revert to the diols and diacids (and oligomers thereof) from which they are formed. This reversion may occur in the course of preparation of the thermoplastic elastomer of the present invention.

With the diester or diacid hard segment precursors described herein, the elastomers can be made conveniently by conventional esterification and/or ester interchange reactions. One procedure involves heating the diacid providing the hard segment, such as p-phenylene-bis-(N-trimellitimide) which yields (I) with reactants forming the soft segment such as a low molecular weight diol or mixture of diols in molar excess and a low molecular weight aliphatic diacid or mixture of diacids with catalyst at about 220° to 300° C. followed by distilling off water formed by the esterification reaction. Heating is continued until water evolution is complete, generally from a few minutes to a few hours. This procedure results in the preparation of a low molecular weight prepolymer which can be carried to a high molecular weight copolyester of this invention by the procedure described below. If the dimethyl ester of the low molecular weight aliphatic diacid is used in place of the free acid, methanol rather than water is evolved. As will be well understood by those skilled in the art, the anhydrides or acid chlorides can be used with or in place of the diacids. Alternatively, the prepolymer can be prepared from the free acids with diacetates of the diols (in which case acetic acid is removed by distillation), or with "ethylene oxide type" cyclic ethers or with carbonates. If desired an ester interchange reaction can be employed as for example by reacting the diacid providing the hard segment with a high or low molecular weight ester homo- or copolymer in the presence of catalyst until randomization occurs. A small amount of low molecular weight aliphatic diacid or diol would be added for stoichiometric balance if required.

The prepolymer is then carried to high molecular weight by distillation of the excess of diols. Additional esterification and/or ester interchange occurs during this distillation to increase the molecular weight and to randomize the arrangement of the copolyester units. Best results are usually obtained if this final distillation or polycondensation is run at less than 5 mm pressure and at 250°–300° C. for less than 4 hours in the presence of antioxidants such as N,N'-hexamethylene-bis(3,5-di-tert-butyl-4-hydroxyhydrocinnamamide). In order to avoid excessive hold time at high temperatures with possible irreversible thermal degradation, it is advantageous to employ a catalyst for the esterification and/or ester interchange reactions. While a wide variety of catalysts can be used, organic titanates such as tetrabutyl titanate (TBT) used alone or in combination with magnesium or calcium acetates are preferred in cases where ester interchange is the sole mechanism of polymerization. Inorganic titanates such as lanthanum titanate, calcium acetate/antimony trioxide mixtures and lithium and magnesium alkoxides are representative of other catalysts which can be used. While the aforementioned ester interchange catalysts are effective in ester interchange reactions (where esters and diols are reacted), in direct esterification (between diols and diacids), acid catalysts such as sulfuric or p-toluenesulfonic acids or antimony trioxide are the preferred catalysts.

Esterification or ester interchange polymerizations are generally run in the melt without added solvent, but inert solvents can be used to facilitate removal of volatile components from the mass at lower temperatures. This technique is especially valuable during prepolymer preparation, for example, by direct esterification. However, certain low molecular weight diols, for example, butanediol are conveniently removed during high polymerization by distillation. Batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol.

Although the copolyesters of this invention possess many desirable properties, it is sometimes advisable to stabilize certain of the compositions to heat or radiation by ultra-violet light. Fortunately, this can be done readily by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4,'-bis(2,6-ditertiarybutylphenol); 1,3,5-trimethyl-2,4,6-tris(3,5-ditertiarybutyl-4-hydroxy-benzyl)benzene (AO-330, Ethyl Corp., Baton Rouge, La.). Various inorganic metal salts or hydroxides can be used as well as organic complexes such as nickel dibutyl-dithio-carbamate, manganous salicylate and copper 3-phenyl-salicylate. Typical amine stabilizers include N,N'-bis(beta-naphthyl)-p-phenylenediamine, N,N'-bis(1-methylheptyl)-p-phenylenediamine and either phenyl-betanaphthylamine or its reaction products with aldehydes. Mixtures of hindered phenols with esters of thiodipropionic acid, mercaptides and phosphite esters are particularly useful. Additional stabilization to ultra-violet light can be obtained by compounding with various UV absorbers such as substituted piperidyl derivatives or substituted benzophenones or substituted benzotriazoles.

In some cases, it may be desirable to incorporate branching agents, (see, for instance, U.S. Pat. Nos. 4,013,624 and 4,205,158) to increase melt strength. In such a case the branching agent would be used at a concentration of 0.001 to 0.005 equivalents per 100 g of polymer. For example, the branching agent may be a polyol having 3–6 hydroxyl groups, a polycarboxylic acid having 3 or 4 carboxyl groups or a hydroxy acid having a total of 3–6 hydroxyl and carboxyl groups.

Representative polyols that function as branching agents that can be used include glycerol, trimethylol propane, 1,2,6-hexanetriol, sorbitol, 1,1,4,4-tetrakis(hydroxymethyl)-cyclohexane, and pentaerythritol. Representative polycarboxylic acids that can be used as branching agents include hemimellitic or trimellitic acid, trimesic acid, pyromellitic acid, 1,1,2,2-ethanetetracarboxylic acid, 1,1,2-ethanetricarboxylic acid; 1,3,5-pentanetricarboxylic acid, and 1,2,3,4-cyclopentanetetracarboxylic acid. Although the acids may be used as such, preferably they are used in the form of their lower alkyl esters.

The properties of these copolymers can be modified by incorporation of various conventional inorganic fillers, such as carbon black, silica gel, alumina, clays and chopped fiber glass. In general, these additives have the effect of increasing the modulus of the material at various elongations. Compounds having a range of hardness values can be obtained by blending polymers of this invention containing varying percentages of hard and soft segments.

A method of improving the tenacity and set of fibers or films from these polymers comprises heating the fibers or films for a period of at least two hours at temperatures of at least 150° C. under an inert atmosphere (see U.S. Pat. No. 3,801,547) and under slight to moderate tension such as might occur in a film cast on and adhering to a glass plate. Heating should not be carried out at such high temperatures or lengthy periods so as to cause deterioration of the polymer or form of the fiber or film. Inert atmospheres include nitrogen, argon, etc.

TEST PROCEDURES

Inherent viscosity is measured as described in "Preparative Methods of Polymer Chemistry", by W. R. Sorenson and T. W. Campbell, Interscience Publishers, 2nd Ed. (1968) p. 44, on a solution of 0.5 g. polymer in 100 ml of m-cresol at 30° C. unless insoluble. It is reported as dL/g (deciliters per gram).

Melting points (unless otherwise indicated) were measured on a Du Pont Model 9900-Differential Scanning Calorimeter (DSC) by methods described in "Thermal Analysis" by B. Wunderlich, published by Rensselaer Polytechnic Institute (1981), and are defined as the temperature at the lowest point of the endotherm of transition to an isotropic melt.

Tenacity (break strength, T, in grams per denier, gpd) and elongation at break (E, %) were measured as described in ASTM Method D 2653-72, "Standard Test Method for Breaking Load and Elongation of Elastomeric Yarns."

The % set was measured as described in ASTM Method D 2731-72, "Standard Test Method for Elastic Properties of Elastomeric Yarns."

The following examples except for the controls are illustrative of the present invention and are not intended as limiting.

EXAMPLE 1

This example shows preparation of the diacid that provides radical (I).

p-phenylene-bis-(N-trimellitimide), was synthesized by adding 54 g of p-phenylenediamine in 200 cc anhydrous N,N-dimethylformamide (DMF) to a refluxing solution of 192 g of trimellitic anhydride in 500 cc anhydrous DMF. After refluxing for 2 hr and cooling, the dispersion was filtered and dried in a vacuum oven at 110° C. to remove solvent. The yield was 191 g. A portion recrystallized from DMF had a DSC melting point of 455° C. The di-n-butyl ester of this diacid was synthesized. It had an nmr spectrum consistent with the attributed structure. The DSC melting point of the ester was 274.8° C.

The size of the group "X" of

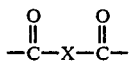

corresponding to diacid radical I identified above, as measured from a Dreiding model laid flat in its shortest conformation was 15 Angstroms. The shortest conformation is with the carboxyl carbonyls positioned cis to one another.

EXAMPLE 2

This example shows preparation of an elastomer from the diethyl ester of the diacid of Example 1 and diethylene glycol and esters of various diacids. Melt-spun filaments are prepared.

35 g of a mixture containing, on a wt. % basis, about 55% dimethyl glutarate, 26% dimethyl succinate, and 18% dimethyl adipate, along with 31 g diethylene glycol, 11.2 g of the diethyl ester of p-phenylene-bis-(N-trimellitimide) (see Ex. 1) and 0.14 g of an antioxidant (AO-330) were degassed. The mixture was held at 220°-235° C. for 20 min in a resin kettle equipped with a Vigreaux fractionating column attached to a distillation head and a receiving flask. Then ½ ml of a 5% solution of TBT (catalyst) in diethylene glycol was added to the refluxing cloudy yellow solution. The mixture was kept under nitrogen as methanol and ethanol distilled over. After 35 min. no more methanol or ethanol was given off. While keeping the contents of the resin kettle under nitrogen the Vigreaux column was removed and replaced by a "Teflon" joint through which passed a stirring rod connected to a paddle. The solution was stirred, degassed, and another ½ ml of catalyst solution added. The temperature was raised to 256° C. over a period of 17 min. and the mixture refluxed for 18 min (during this time the cloudy solution cleared). The temperature was maintained at 256° C. and a vacuum of 250 mm. Hg applied over a period of 35 min. Vacuum was then applied over the next 26 min (the pressure dropped to 0.1 mm), at which time a very viscous polymer melt was observed. The pressure was returned to atmospheric by introduction of nitrogen, and a nitrogen blanket was maintained while adding a dry mixture of 0.22 g of an antioxidant (Irganox 1098) and 0.22 g of an ultraviolet stabilizer (Tinuvin 144). Vacuum was reinstated for a further 28 min. at which time the molten polymer was isolated under nitrogen.

Differential scanning calorimetry (DSC) of the resultant tough elastomer (at a heating rate of 20° C./min. under nitrogen) indicated that the glass transition temperature was −25.4° C. and that there was a crystalline phase melting at 225.0° C. (heat of fusion 2.11 Joule/g). The polymer composition contained 14.6% by weight of —X— units derived from p-phenylene-bis-(N-trimellitimide). This constitutes the "hard segment". The "soft segment" is derived from diethylene glycol and succinic, glutaric and adipic acids. Filaments, which were melt-spun at 290° C. had the following average tenacity (gpd) and elongation (%) (in subsequent examples designated as "T/E") 0.282 gpd/197%.

EXAMPLE 3

This example illustrates a polymer with a different soft segment than that of Example 2.

4.05 g of adipic acid, 19.5 g of azelaic acid, 6.45 g of dodecanedioic acid, 4.7 g of p-phenylene-bis-(N-trimellitimide), 19.0 g 1,4-butanediol, 6.0 g ethylene glycol and 0.1 g of antioxidant were degassed at room temperature after which 2 cc of a 1% solution of antimony trioxide in ethylene glycol was added. Keeping the mixture under nitrogen, it was partially immersed in a Woods metal bath at 290° C. Initial foaming subsided after about 30 min, and the yellow slurry was completely immersed in the bath. After refluxing for 35 min the refluxing solution became clear. The solution was refluxed for 22 min under pressure of 250 mm. Hg. with the temperature at 286° C. Over the next 17 min. the pressure was gradually reduced to 0.15mm and the temperature lowered to 275° C. After 21 min at 0.15 mm pressure, the polymer became very viscous. Vacuum was released by introduction of nitrogen, a UV stabilizer and an antioxidant were added, and the melt polymerized a further 6 min. at 280° C. and 0.10 mm. pressure.

A DSC of the resultant tough elastomer showed a Tg of −49.6° C. The polymer contained 8.9% by weight of —X— units derived from p-phenylene-bis-(N-trimellitimide). The inherent viscosity was 1.08.

EXAMPLE 4

This example illustrates the use of other hard and soft segments.

In this example, 33.4 g of azelaic acid, 8.2 g of the dibutyl ester of the diacid radical II, identified above, 20.3 g diethylene glycol, 3 g ethylene glycol, 0.15 g of antioxidant and 0.1 g of tetra-n-butylphosphonium salt of 3,5-dicarbomethoxybenzene 1-sulfonic acid (TBPS) were mixed at room temperature after which 1.5 cc of a 1% solution of antimony trioxide in ethylene glycol was added. The mixture under nitrogen was immersed in a Woods metal bath at 297° C. After initial foaming, the refluxing solution became clear in 40 min. After refluxing a further 13 min, the pressure was reduced to 250 mm Hg. over a period of 31 min, after which time full pump vacuum was applied and the temperature dropped to 283° C. After 85 min at 0.1 mm pressure, the polymer became very viscous. Vacuum was released by introduction of nitrogen, stabilizers were added, and the melt polymerized a further 25 min at 0.1 mm pressure. The polymer was cut up and extracted with acetone, stabilizers were added and then it was dried at 110° C. under nitrogen for 24 hr.

A DSC of the resultant tough elastomer showed a Tg. of −48.3° C. The polymer was calculated to contain 10.8% by weight of —X— units corresponding to diacid radical II. The inherent viscosity was 1.46. A film was cast from a 10% solution in N,N-dimethylacetamide (DMAC). After removal of solvent in a vacuum oven at 100° C. under nitrogen, strips of the resultant film had a T/E of 0.078/1058 and a set of 26.7% after extending 5 times to 300%.

The di-n-butyl ester of diacid radical II had a nuclear magnetic resonance (nmr) spectrum consistent with the structure. The DSC melting point was 352° C.

The length of the group "X" in

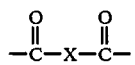

which corresponds to diacid radical II identified above as measured from a Dreiding model laid flat with the carboxyl carbonyls positioned trans to one another was 21 Angstroms.

EXAMPLE 5

In this example, 33.4 g of azelaic acid, 8.73 g of the dibutyl ester of diacid radical III identified above, 20.5 g diethylene glycol, 3 g ethylene glycol 0.15 g of antioxidant, and 0.1 g of TBPS (not essential, but added as a melt stabilizer) were mixed at room temperature after which 1.5 cc of a 1% solution of antimony trioxide in ethylene glycol was added. This mixture was polymerized substantially as described in Example 4.

A DSC of the resultant tough elastomer (after extracting with acetone) showed a Tg of −46.3° C. The polymer was calculated to contain 10.4% by weight of —X— units corresponding to the diacid radical III. The polymer was insoluble in m-cresol. However, a film was cast from a 10% solution obtained by boiling in DMAC. After removal of solvent in a vacuum oven at 100° C. under nitrogen, strips of the resultant film had a T/E of 0.026/900 and a set of 25.6% after extending 5 times to 300%. A film kept for 3 days at 160° C. under vacuum and purged with nitrogen had a T/E of 0.171/738 and a set of 15% after extending 5 times to 300%.

The di-n-butyl ester of the diacid radical III had a DSC melting point of 319° C. The length of the group "X" in

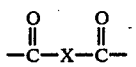

corresponding to diacid radical III as measured as previously described was 15.4 Angstroms.

EXAMPLE 6

In this example, 25 g of adipic acid, 10 g glutaric acid, 7.4 g of the dibutyl ester of diacid radical IV identified above, 24.5 g 1,4-butanediol, 4 g ethylene glycol, 0.3 g of anitoxidant, and 0.2 g of the TBPS were mixed at room temperature after which 1.5 cc of a 1% solution of antimony trioxide in ethylene glycol was added. This mixture was polymerized substantially as described in Example 4.

A DSC of the resultant tough elastomer (after extracting with acetone) showed a Tg of −50.8° C. and a melting point of 149.3° C. The polymer was calculated to contain 9.4% by weight of —X— units corresponding to diacid radical IV. Inherent viscosity of the polymer was 1.18 A fiber which was melt-spun at 250° C. had a T/E of 0.070/403 and a set of 26.3% after extending 5 times to 300%.

The di-n-butyl ester of diacid radical IV was synthesized in a similar manner to that of example 1 and had an nmr spectrum consistent with the attributed. structure. The DSC melting point was 298° C.

The length of the group "X" in

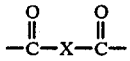

as measured from a Dreiding model laid flat in the shortest conformation was 17 Angstroms.

EXAMPLE 7

This example illustrates the production of a thermoplastic elastomer of the invention but where minor amounts of the "soft" segment units comprise polyalkylene ether glycol moieties not conforming to the requirement that the molecular weight "R" of the —O—R—O— units be under 450.

In this example, 22 g of adipic acid, 8.8 g glutaric acid, 6.07 g of p-phenylene-bis-(N-trimellitimide), 20 g ethylene glycol, 0.2 g of antioxidant, 0.15 g of TBPS, and 4.1 g of 2000 molecular weight polytetramethylene ether glycol were mixed at room temperature after which 1 cc of a 1% solution of antimony trioxide in ethylene glycol was added. This mixture was polymerized substantially as described in Example 4, the final polymerization temperature being 251° C.

A DSC of the resultant tough elastomer (after extracting with acetone) showed glass transition temperatures of −80.6° C. and −34.6° C. and a major melting point of 149.3° C. The composition was calculated to contain 10.4% by weight of —X— units corresponding to p-phenylene-bis-(N-trimellitimide). The polymer was insoluble in m-cresol. A film was cast from DMAC in which the polymer was readily soluble. After removal of solvent in a vacuum oven at 100° C. under nitrogen, strips of the resultant film had a T/E of 0.075/475 and a set of 62% after extending 5 times to 300%. A film kept for 3 days at 160° C. under vacuum and nitrogen had a T/E of 0.181/549 and a set of 34.8% after extending 5 times to 300%.

EXAMPLE 8

This example illustrates the production of a elastomer of the invention but where minor amounts, about 10% by weight of the "soft" segment units comprise dimer acid moieties not conforming to the requirement that the molecular weight of "R²" of the

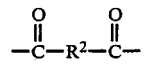

units be under 450.

In this example, 18.4 g of adipic acid, 7.35 g glutaric acid, 5.68 g of p-phenylene-bis-(N-trimellitimide), 18 g ethylene glycol, 0.2 g of antioxidant, 0.1 g of TBPS, and 3.4 g of "dimer" acid, a commercially available (Emory Empol 1010) dimer of linoleic and linolenic acids (molecular weight >450) and containing 3% trimer were mixed at room temperature after which 1 cc of a 1% solution of antimony trioxide in ethylene glycol was added. This mixture was polymerized substantially as described in Example 4, the final polymerization temperature being 271° C.

A DSC of the resultant tough elastomer (after extracting with acetone) showed a Tg of −96.8° C. and a Tg of −27.1° and a melting point of 149.5° C. The composition was calculated to contain 11.4% by weight of —X— units corresponding to p-phenylene-bis-(N-trimellitimide). The polymer inherent viscosity was 0.94. Films were cast from DMAC. After removal of solvent in a vacuum oven at 100° C. under nitrogen, strips of the resultant film had a T/E of 0.044/357 and a set of 54% after extending 5 times to 300%. A film kept for 3 days at 160° C. under vacuum and nitrogen had a T/E of 0.162/716 and a set of 34.8% after extending 5 times to 300%.

EXAMPLE 9

This example illustrates the production of a thermoplastic elastomer of the invention where minor amounts, about 10% by weight of the "soft" segment is derived from an aromatic dicarboxylic acid.

In this example, 19.5 g of adipic acid, 7.81 g glutaric acid, 5.68 g of p-phenylene-bis-(N-trimellitimide), 20 g ethylene glycol, 0.15 g of antioxidant, 0.1 g of TBPS, and 4.44 g of isophthalic acid were mixed at room tem-

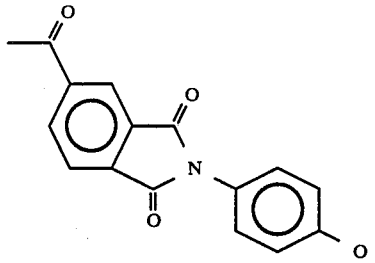

perature after which 1 cc of a 1% solution of antimony trioxide in ethylene glycol was added. This mixture was polymerized substantially as described in Example 4, the final polymerization temperature being 278° C.

A DSC of the resultant tough elastomer (after extracting with acetone) showed a Tg of −22.7° C. and a melting point of 177.6° C. The polymer inherent viscosity was 1.58. Films were cast from DMAC. After removal of solvent in a vacuum oven at 100° C. under nitrogen, strips of the resultant film had a T/E of 0.084/542 and a set of 35% after extending 5 times to 300%. A film dried for 3 days at 160° C. under vacuum and nitrogen had a T/E of 0.273/636 and a set of 19% after extending 5 times to 300%. A fiber melt spun from a somewhat lower inherent viscosity replica had a T/E of 0.205/478 and a set of 40% after extending 5 times to 300%.

EXAMPLE 10
(Control)

This example illustrates the use of a diacid which provides units not conforming to the —Y—X—Z— units required by the present invention. The diacid is as follows:

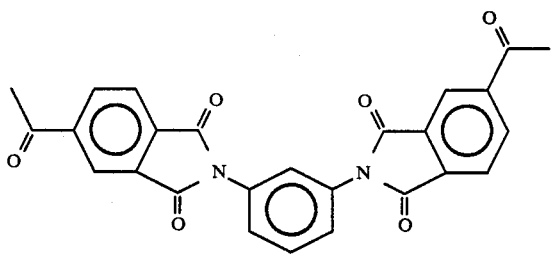

In this example, 25 g of adipic acid, 10 g glutaric acid, 7.71 g of the above depicted diacid (formed by reaction of two moles of trimellitic anhydride with one mole of m-phenylenediamine), 24 g 1,4-butanediol, 5 g ethylene glycol, 0.2 g of antioxidant, and 0.25 g of TBPS were mixed at room temperature after which 2 cc of a 1% solution of antimony trioxide in ethylene glycol was added. This mixture was polymerized substantially as described in Example 4, the final polymerization temperature being 270° C.

The resultant gum failed to crystallize, having the consistency of chewing gum, and was soluble in acetone. The composition was calculated to contain 10.8% by weight of —X— units derived from the diacid. The polymer inherent viscosity was 0.71.

The di-n-butyl ester of the non-conforming diacid had a DSC melting point of 106° C., well below the requirements of the present invention.

The size of the group "X" in

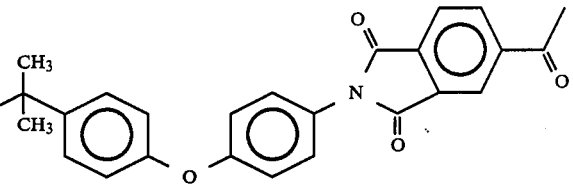

of the depicted diacid as measured from a Dreiding model laid flat on a table with the carboxyl carbonyls positioned cis to one another was 12.4 Angstroms.

EXAMPLE 11
(Control)

This example illustrates the use of a diacid which provides units not conforming to the —Y—X—Z— units required by the present invention. The diacid is as follows:

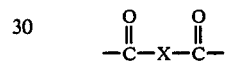

In this example, 20.8 g of azelaic acid, 9.2 g dodecanedioic acid, 7 g of the dibutylester of the above depicted diacid, (formed by reaction of two moles of trimellitic anhydride with one mole of 2,2-bis[4-(4-aminophenoxy)phenyl]propane), 19 g 1,4-butanediol 4 g ethylene glycol, 0.15 g of antioxidant, and 0.1 g of TBPS were mixed at room temperature after which 2 cc of a 1% solution of antimony trioxide in ethylene glycol was added. This mixture was polymerized substantially as described in Example 4, the final polymerization temperature being 271° C.

The resultant polymer was a gum not forming an elastomer, having the consistency of chewing gum, and was soluble in acetone. The composition was calculated to contain 12% by weight of —X— units derived from the diacid. The polymer inherent viscosity was 0.91. DSC failed to indicate any melting point. Films cast from DMAC were still sticky and gummy after three days at 100° C. or for 3 days at 160° C./nitrogen/-vacuum.

The di-n-butyl ester of the depicted diacid had an nmr spectrum consistent with the expected structure and a DSC melting point of 153.2° C., well below that required by the present invention.

EXAMPLE 12

In this example, an aliphatic polycarbonate "soft" segment is formed. 5.7 g of p-phenylene-bis-(N-trimellitimide), 10.3 g 1,6-hexanediol, 19.0 g 1,5-pentanediol, 25 g ethylene carbonate, and 0.2 g antioxidant were degassed and then 2 cc of 5% TBT in ethylene glycol were added. The solution was refluxed for 30 min at each of the following temperatures: 170°, 180°, and 190° C., and then pressure reduced to 630 mm Hg for 30 min at each of the following temperatures: 190°, 210°, and 220° C. Holding the temperature at 220° C. the pressure was gradually increased to 75 mm Hg over two hours. The pressure was then reduced to 0.45 mm over the next 95 min. After 23 min at this pressure, atmospheric pressure was restored and the polymer was isolated.

A film was cast from a hot DMAC solution of the polymer after filtering through cheesecloth. After removal of solvent and maintaining at 160° C. for three days under nitrogen, the resulting film was a strong elastomer with an average T/E of 0.170/93. The % set of one film strip was 20 after extending five times to 100%. The composition was calculated to contain 10.7% of —X— units derived from p-phenylene-N,N$^1$-bis-trimellitimide.

EXAMPLE 13

In this example,

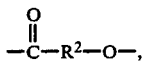

"soft" segment units are provided by use of caprolactone. If it is desired to also incorporate units from an aliphatic diacid, the latter must be matched with an equivalent amount of units from a diol.

6.0 g p-phenylene-bis-(N-trimellitimide), 36 g caprolactone, 5 g ethylene glycol, 0.2 g antioxidant, and 0.2 g TBPS were degassed and 1 cc of a 1% solution of antimony trioxide in ethylene glycol and 1 cc of a 5% solution of TBT in ethylene glycol were added. The polymerization was effected substantially as in Example 4 (except that no stabilizers were added), the final polymerization temperature being 250° C.

A DSC of the resultant tough elastomer after extraction with acetone and removal of solvent by drying in a vacuum oven under nitrogen at 100° C. showed a Tg of −55° C., and a melting point of 144.9° C. The inherent viscosity of the extracted polymer was 1.06. Films were prepared by dissolving the elastomer in hot DMAC and casting. After removal of solvent in a vacuum oven at 10° C. under nitrogen the resulting film was a strong elastomer with T/E of 0.322/395.

EXAMPLE 14

In this example, 15.2 g of adipic acid, 6.1 g glutaric acid, 6.3 g of the dibutyl ester of the diacid corresponding to radical VI identified above, 19 g 1,6-hexanediol, 2 g ethylene glycol, 2 g 1,3-propylene glycol, 0.2 g of antioxidant, and 0.15 g of the TBPS were mixed at room temperature after which 1.5 cc of a 1% solution of antimony trioxide in ethylene glycol was added. This mixture was polymerized substantially as descrbed in Example 4.

A DSC of the resultant elastomer showed a Tg −45.6° C. The polymer was calculated to contain 10.6% by wt of —X— units derived from diacid radical VI. The polymer was insoluble in the m-cresol solvent, but was readily soluble in DMAC. A film was cast from a solution in DMAC. After removal of solvent in a vacuum oven at 100° C. under nitrogen, strips of the resultant film had a T/E of 0.138/678 and a set of 16.7% after extending 5 times to 300%.

The di-n-butyl ester of diacid corresponding to radical (VI) had an nmr spectrum consistent with the desired structure. The DSC melting point was measured to be 273° C.

The length of the group "X" in

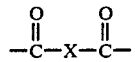

corresponding to diacid radical (VI), as measured from a Dreiding model laid flat with the carboxyl carbonyls positioned cis to one another was 15.4 Angstroms.

EXAMPLE 15

The process of this example is a two step process. In a first step, the hard segment precursor is synthesized as a slurry in an inert medium from the appropriate anhydride and diamine.

A liquid reaction medium is necessary in the first step to allow in situ preparation of the diacid as a slurry of fine particles. The reaction medium is preferably any diester of an aliphatic diacid (or mixture of such diesters) that is (are) liquid at about 100° C. and inert to the reaction with aromatic diamines or cyclic anhydrides.

In a second step, the other requisite monomers and catalyst are added to the slurry and the resultant suspension is then polymerized without isolation or further purification of the diacid, the added catalyst causing the previously inert reaction medium to become a coreactant so that the need for reaction medium recovery is avoided.

A 10/90 by weight mixture (30.3 g) of the dimethyl esters of glutaric and adipic acids, respectively, 4.7 g trimellitic anhydride, 1.35 g p-phenylenediamine, and 0.15 g of antioxidant were stirred for 30 min at 215° C. under nitrogen. Then 19.7 g of diethylene glycol, 3 g of ethylene glycol, and 0.1 g of TBPS were added to the resultant fine slurry and the dispersion stirred for 5 min at 215° C. Then 1 cc of a 5% solution of TBT in ethylene glycol was added and the solution was stirred for 60 min at 213° C., after which the reaction temperature was raised to 253° C., the dispersion becoming a clear solution after stirring for 29 min at 253° C. under nitrogen. This clear solution was then polymerized substantially as described in Example 4.

The resultant tough elastomer had an inherent viscosity of 1.58 in m-cresol. A piece of polymer was stretched at room temperature to twice its length, held for one minute before release. Within one minute, it retracted to less than 1.5 times its original length. A DSC, after extraction with acetone, showed a Tg of −22.8° C. and a melting point of 157.6° C. The composition was calculated to contain 10.4% by wt. of —X— units derived from p-phenylene-bis-(N-trimellitimide). A melt spun fiber (spun at 288° C.) drawn 2X had T/E of 0.126/237 and a set of 23.3% after extending 5 times to 200%.

EXAMPLE 16

In the process of this example, all of the monomers are added in one step. This example also shows in situ preparation of diacid radical IV.

To illustrate, 2.92 g of benzophenone dianhydride, 3.7 g of the mono-n-butyl ester of p-aminobenzoic acid, 25 g azelaic acid, 14.5 g diethylene glycol, 2 g ethylene glycol, 3 g 1,3-propylene glycol, 0.2 g of antioxidant, and 0.1 g TBPS were mixed at room temperature after which 1.7 cc of a 1% solution of antimony trioxide in ethylene glycol was added. This mixture was then polymerized substantially as described in Example 4.

A DSC of the resultant tough elastomer showed a Tg of −47.0° C. and a melting point of 199.2° C. The inherent viscosity in m-cresol was 1.00. The composition was calculated to contain 10.7% by wt. of —X— units derived from diacid radical IV.

EXAMPLE 17

A mixture of 8.6 g. adipic acid, 3.4 g. glutaric acid, 2.7 g of the diacid formed by the reaction of two moles of trimellitic anhydride with one mole of hydrazine, 4.3 g. 1,4-butylene glycol, 4.1 g. 1,3-propylene glycol, 6.5 g. ethylene glycol, 0.1 g. of antioxidant and 0.05 g. of TBPS was prepared at room temperature, after which 0.5 cc. of a 1% solution of antimony trioxide in ethylene glycol was added. This mixture was polymerized similarly to the polymerization of Example 4, the final polymerization temperature being 277° C. An elastomer was not obtained. The resultant gum failed to crystallize, had the consistency of chewing gum and did not show the retractive properties of an elastomer as earlier defined. It was calculated to contain 11.0% by wt. of —X— units.

The di-n-butyl ester of the diacid formed by the reaction of two moles of trimellitic anhydride with one mole of hydrazine had a DSC melting point of 254° C. The size of the group —X— as measured with the carboxyl carbonyl groups cis to one another was 10.8 Angstroms. This length falls below the required limit.

EXAMPLE 18

A mixture of 29.0 g. of an 80/20 weight percent blend of dimethyl esters of glutaric and adipic acids, 6.19 g. of the diethyl ester of the diacid corresponding to the formula VII, 20 g. 1,4-butylene glycol, and 0.15 g. of antioxidant was prepared after which 1.5 cc of a 5% solution of TBT in ethylene glycol was added. This mixture was polymerized substantially as described in Example 4. The final polymerization temperature was 274° C. The resulting tough elastomer showed a Tg of −51.3° C. and endotherms of 68.1° and 126.6° C. by DSC. The polymer was calculated to contain 11.7% by weight of —X— units derived from diacid radical VII. The length of —X— was 19.3 Angstroms.

A film cast from a dimethyl acetamide solution of the polymer was dried overnight under nitrogen and then at 110° C. to remove residual solvent. A strip of the resulting film had a tenacity of 0.087 gpd and an elongation of 1076% and a % set of 66 after cycling 5 times to 300% elongation. Another film was heated at 160° C. for three days in a vacuum oven under nitrogen. A strip thereof had a tenacity of 0.432 gpd and an elongation of 656% and a % set of 22.5 after cycling 5 times to 300% elongation.

EXAMPLE 19

In this example all of the reactants are added in one step, 25.6 g of the dimethyl ester of dodecanedioic acid, 5.68 g of p-phenylene-bis-(N-trimellitimide), 13.9 g of distilled N,N'-dimethylhexanediamine in an amount which would react only with 70.8 mole percent of the two aforementioned diacid derivatives, 1.6 g of diethylene glycol, 2 g of ethylene glycol (stoichiometric excess), 0.15 g of antioxidant, and 1 cc of 5% TBT in ethylene glycol were stirred for 45 min. at 218° C., after which the reaction temperature was raised to 283° C. and the mixture polymerized as described in Example 3. After 30 min. at full vacuum (0.3 mm), the polymerization was completed after a further 35 min. at 292°–295° C.

After extraction with acetone, the resultant product was a tough elastomer with an inherent viscosity of 0.45 in m-cresol. DSC showed a Tg of −36.7° C. and a broad melting point from 140°–210° C. The composition was calculated to contain 11.4% of —X— derived from the diacid radical I. A film cast from DMAC and dried under vacuum and nitrogen at 160° C. had T/E of 0.024/193 and a set of 9% after extending 5 times to 100%.

EXAMPLE 20

This example describes compression molding of a novel polymer.

A polymer derived from the diacid corresponding to radical I and a 29/71 weight % mixture of the methyl diesters of glutaric and adipic acids with butylene glycol was prepared substantially as described in Example 3. It was calculated to contain 13.6% of —X— units. The resultant product was a tough elastomer with an inherent viscosity of 1.36 in m-cresol. DSC showed a Tg of −47.7° C. and a sharp melting point at 145.6° C. A 75 mil slab was compression molded from the elastomer at 300° C.

EXAMPLE 21

In this example, diacid radical VIII was synthesized as the major component of a mixture of oligomers from precursor monomers diphenylterephthalate and p-phenylenediamine. Also in this example, the desired soft segment came from a 50/50 mixture of presynthesized polyester diols which are commercially available (these oligomers revert to the precursor fragments during the polymerization). 13 g of the polyester diol of ethylene glycol and adipic acid (MW=2000) and 13 g of the polyester diol of butylene glycol and adipic acid (MW=2000), 14.95 g diphenylterephthalate, 1.69 g of p-phenylenediamine, 4 g ethylene glycol, 3 g of butylene glycol, 0.15 g antioxidant, 0.1 g TBPS and 1 cc of a 56% solution of antimony trioxide in ethylene glycol were stirred for 8 min. at 273° C. The clear solution was then put through a vacuum cycle at 283° C. as described in Example 3. After attaining full pump vacuum the temperature was lowered to 245° C., and polymerization of the cloudy melt completed at this temperature.

The composition of the resultant tough polymer was calculated to contain 13.8% of —X— derived from diacid radical VIII. The length of —X— was 15.8 Angstroms. A fiber melt spun at 270° C. and drawn 2X was shown by DSC to have a Tg of −41.9° C. and a melting point of 217.4° C. The fiber had a T/E of 0.112/597 and a set of 24.7% after extending 5 times to 300%.

EXAMPLE 22

Polymers of the invention having a soft segment made substantially from neopentyl glycol (NPG) and an aliphatic acid of the formula

HOOC(CH$_2$)$_n$COOH with n equal to 7 or more show enhanced tenacity and resistance to degradation in boiling water.

In this example, dodecanedioic acid and neopentyl glycol are employed. 25.8 g of dodecanedioic acid, 14 g of NPG, 2.5 g ethylene glycol, 2 g 1,3-propylene glycol, 5.68 g of diacid (I), 0.15 g of AO 330, and one cc of a 1% solution of antimony trioxide in ethylene glycol were stirred for 55 min at a bath temperature of 315° to 321° C., after which time the dispersion became a clear solution. Over a period of 9 min, the temperature was dropped to 291° C. for the intermediate vacuum stage which lasted 34 min, after which the melt was polymerized at 276° C. substantially as described in Example 3.

The resultant tough elastomer had an inherent viscosity of 0.98 in m-cresol. The composition was calculated to contain 11.4% of —X— units derived from diacid radical (I). A fiber melt spun at 240° C. and drawn about 3.5X had a tenacity of 0.41 gpd. The break elongation of this fiber was 270% and a set of 4% was obtained after extending 5 times to 100%.

EXAMPLE 23

Polymer of the invention having a soft segment made substantially from 1,2-propanediol and aliphatic diacid(s) show enhanced tenacity.

In this example, 31.8 g of an 80/20 by weight mixture of dimethyl glutarate and dimethyl adipate, 5.73 g of p-phenylene-bis-(N-trimellitimide), 20 g 1,2-propanediol and 0.15 g antioxidant were mixed at room temperature after which 1 cc of a 5% solution of TBT in ethylene glycol was added. After stirring for 30 min at 210° C., the mixture was polymerized substantially as described in Example 4.

A DSC of the resultant tough elastomer (after extracting with acetone) showed a Tg of −28.2° C. and a melting point at 146.3° C. The composition was calculated to contain 11.4% by weight of units —X— derived from p-phenylene-bis-(N-trimellitimide). The polymer inherent viscosity in m-cresol was 0.58. After treating in an oven at 160° C. under nitrogen and vacuum for 48 hours (solid phase polymerization) so as to increase the polymer molecular weight, films were cast from DMAC. After removal of solvent in a vacuum oven at 100°-110° C. under nitrogen, a strip of the resultant film had a T/E of 0.0993/1001.

EXAMPLE 24

Polymers of the invention having a soft segment made from phenylglycidyl ether (PGE) and other aliphatic diol(s) and aliphatic diacid(s) show enhanced tenacity.

In this example, 19.3 g adipic acid, 7.7 g glutaric acid, 5.68 g of p-phenylene-bis-(N-trimellitimide), 3.48 g PGE, 16 g ethylene glycol, and 0.15 g antioxidant were mixed at room temperature after which 1 cc of a 1% solution of antimony trioxide in ethylene glycol was added. This mixture was polymerized substantially as described in Example 4.

A DSC of the resultant tough elastomer (after extracting with acetone) showed a Tg of −29.4° C. and a mp of 137.0° C. The composition was calculated to contain 11.4% by weight of units —X— derived from p-phenylene-bis-(N-trimellitimide). The polymer inherent viscosity in m-cresol was 0.87. Films were cast from DMAC. After removal of solvent in a vacuum oven at 100°-110° C. under nitrogen, a strip of the resultant film had a T/E of 0.108/805.

EXAMPLE 25

In this example, 26.7 g of an 80/20 by weight mixture of the dimethyl esters of glutaric and adipic acids, respectively, 6.6 g of the diethyl ester of the diacid corresponding to radical V above, 23.5 g neopentyl glycol, and 0.15 g of AO 330 were mixed at room temperature after which 1.5 cc of a 5% solution of tetra-n-butyltitanate in ethylene glycol was added. This mixture was polymerized substantially as described in Example 4.

A DSC of the resultant soft elastomer showed a Tg of −21.4° C. The composition was calculated to contain 11.1% of —X— units derived from diacid radical (V). The polymer had an inherent viscosity of 0.40 in m-cresol. A cast film heated at 160° C. for three days under nitrogen and vacuum to increase the molecular weight was a weak thermoplastic elastomer, a strip of which had T/E of 0.032 gpd/504% and a % set of 13.6 after extending 5 times to 300%.

The di-n-butyl ester of diacid corresponding to radical (V) was synthesized from terephthaloyl chloride and the butyl ester of p-aminobenzoic acid and had an nmr spectrum consistent with the desired structure. The DSC melting point was measured to be 267° C.

The length of the group "X" in

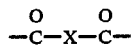

corresponding to diacid radical (V) as measured from a Dreiding model laid flat with the amide carbonyls positioned trans to one another was 15.6 Angstroms.

EXAMPLE 26

In this example, all of the reactants are added in one step. 25.7 g of the dimethyl ester of azelaic acid, 19.5 g of N,N'-dimethylhexanediamine (98% pure), 6.05 g of diacid corresponding to radical (I) above, and 0.15 g of AO 330 were stirred for 45 min at 212° C., after which the reaction temperature was gradually raised to 275° C. over a period of 27 min, after a further 10 min at this temperature, the temperature was raised to 282° C. There was no increase in melt viscosity after 4 hours, so the temperature was raised to 292° C. and held there for 2 more hours, still with no apparent increase in viscosity, after which the reaction was terminated.

The resultant product was a tough elastomer even though it had an inherent viscosity of 0.56 in m-cresol. A DSC (after extraction with acetone) showed a Tg of −25.5° C. and a melting point at 172.9° C. A film cast from DMAC and dried under vacuum and nitrogen at 160° C. had T/E of 0.037/241 and a set of 7% after extending 5 times to 100%.

EXAMPLE 27

This example shows the effect of using a branching agent.

A control polymer was made as follows: 19.5 g of adipic acid, 7.81 g glutaric acid, 5.68 g of p-phenylene-bis-(N-trimellitimide), 4.44 g isophthalic acid, 20 g ethylene glycol, 0.1 g TBPS, and 0.15 g antioxidant were mixed at room temperature after which 1 cc of a 1% solution of antimony trioxide in ethylene glycol was added. This mixture was polymerized substantially as described in Example 4. A polymer of identical composition, but containing an added 0.1% by weight 1,2,6-trihydroxy-hexane as branching agent was prepared in the same manner.

The control polymer inherent viscosity in m-cresol was 1.58. The polymer containing 0.1% branching agent was insoluble in m-cresol. Films of both were cast from DMAC. After removal of solvent in a vacuum oven at 100° C. under nitrogen, a strip of the resultant control film had tenacities of 0.036 and 0.041 gpd at 100% and 200% elongation, respectively, whereas a strip of the composition containing 0.1% branching agent had tenacities of 0.053 and 0.060 gpd at 100% and 200% elongation, respectively. The control composition had a T/E at break of 0.084/542 and the composition containing 0.1% branching agent had a T/E at break of 0.065/301.

EXAMPLE 28

In this example, 20.0 g of a mixture containing 13% adipic acid, 60% glutaric acid, and 27% succinic acid, 10.37 g of p-phenylene-bis-N-trimellitimide), 3.2 g phenylglycidyl ether, 11.3 g ethylene glycol, 3.2 g diethylene glycol, and 0.3 g antioxidant were mixed at room temperature after which 1.5 cc of a 1% solution of antimony trioxide was added. This mixture was polymerized substantially as described in Example 4.

A DSC of the resultant polymer (after extracting with acetone) showed a Tg of −22.1° C. and a melting point of 220.0° C. The composition was calculated to contain 21.8% by weight of units —X— derived from p-phenylene-bis-(N-trimellitimide). The polymer inherent viscosity in m-cresol was 0.59. Films were cast from DMAC. After removal of solvent in a vacuum oven at 100° C. under nitrogen, strips of the resultant film had a T/E of 0.084/43 (the film was "short-breaking" due to the low molecular weight of this particular example). A film kept for 3 days at 160° C. under vacuum and nitrogen was a tough elastomer and had a T/E of 0.113/247 and a set of 83% after extending 5 times to 300%.

EXAMPLE 29

In this example, 30 g azelaic acid, 18.1 of neopentyl glycol (NPG), 2.3 g of p-phenylene-bis-(N-trimellitimide), 2.5 g ethylene glycol, 2 g 1,3-propylene glycol, and 0.15 g of AO 330 were mixed at room temperature after which one cc of a 1% solution of antimony trioxide in ethylene glycol was added. This mixture was polymerized substantially as described in Example 4, the final temperature being 271° C.

The resultant product was extracted with acetone and dried. A DSC of this elastomer shows a Tg of −52.1° C. and a melting point of 122.5° C. The composition was calculated to contain 4.3% by weight of units —X— derived from diacid radical (I). The polymer's inherent viscosity as measured in m-cresol was 1.25. A film cast from DMAC and dried at 110° C. had a T/E of 0.036/764 and a set of 16.5% after extending 5 times to 300%.

EXAMPLE 30

In this example, 22.2 g of a mixture of approximately 27% succinic, 61% glutaric, and 12% adipic acids by weight obtained by distillation of a waste stream, 1.42 g p-phenylene diamine, 4.78 g trimellitic anhydride, 23.5 g NPG, and 0.15 g antioxidant were mixed at room temperature after which 1 cc of a 1% solution of antimony trioxide in ethylene glycol was added. After stirring for 30 min at about 50° C., the mixture was polymerized substantially as described in Example 4.

A DSC of the resultant tough elastomer (after extracting with acetone) showed a Tg of −19.6° C. The composition was calculated to contain 11.4% by weight of units —X— derived from p-phenylene-bis-(N-trimellitimide). The polymer inherent viscosity in m-cresol was 0.94. Films were cast from DMAC. After removal of solvent in a vacuum oven at 100°-110° C. under nitrogen, a strip of the resultant film had a T/E of 0.056/193.

EXAMPLE 31

In this example, 28.5 g glutaric acid, 6.86 of the dibutyl ester of diacid radical (IX) identified above, 19.1 g ethylene glycol, and 0.15 g antioxidant were mixed at room temperature after which 1 cc of a 5% solution of tetrabutyltitanate in ethylene glycol was added. After stirring for one hour at 230° C., the mixture was polymerized substantially as described in Example 4.

The resultant polymer retracted to less than 1.5 times its original length within one minute after being stretched at room temperature to twice its length and held one minute before release. The composition was calculated to contain 11.6% by weight of units —X— from acid radical (IX). The melting point of the di-n-butyl ester of the diacid based on radical (IX) was 305° C. The size of the group —X— as measured with the carboxyl groups cis to one another was 15.1 Angstroms.

EXAMPLE 32

In this example, 21.6 g of an approximately 80/20 mixture by weight of dimethyl glutarate and dimethyl adipate, 5.0 g of the dibutyl ester of diacid radical (X) identified above, 16.6 g 1,4-butanediol and 0.15 g antioxidant were mixed at room temperature after which 1 cc of a 5% solution of tetrabutyltitanate (TBT) in ethylene glycol was added. After stirring for one hour at 210° C., the mixture was polymerized substantially as described in Example 4.

The resultant polymer retracted to less than 1.5 times its original length within one minute after being stretched at room temperature to twice its length and held one minute before release. The composition was calculated to contain 11.7% by weight of units —X— derived from acid radical (X). The melting point of di-n-butyl ester of the diacid based on radical (X) was 255.7° C. The size of the group —X— as measured with the carboxyl groups trans to one another was 19.3 Angstroms.

EXAMPLE 34

In this example, 19.2 g of an approximately 80/20 mixture by weight of dimethyl glutarate and dimethyl adipate, 4.32 g of the half ester (the monobutyl aromatic ester) half acid of diacid radical (XI) identified above, 13.6 g 1,4-butanediol and 0.10 g antioxidant were mixed at room temperature after which 1 cc of a 5% solution of tetrabutyltitanate in ethylene glycol was added. After strring for 45 min at 210° C., the mixture was polymerized substantially as described in Example 4. The resultant polymer retracted to less than 1.5 times its original length within one minute after being stretched at room temperature to twice its length and held one minute before release. The composition was calculated to contain 10.2% by weight of units —X— derived from acid radical (XI). The di-n-buty ester of the diacid based on radical (XI) melted to an isotropic melt at 229.8° C. The size of the group—X—when measured as depicted above was 11.3 Angstroms.

EXAMPLE 34

In this example, 22.9 g glutaric acid, 5.7 g adipic acid, 6.71 g of the dibutyl ester of diacid radical (XII) identified above, 18.8 g ethylene glycol and 0.15 g antioxidant were mixed at room temperature after which 1 cc of a 1% solution of antimony trioxide in ethylene glycol was added. This mixture was polymerized substantially as described in Example 4.

The resultant polymer retracted to less than 1.5 times its original length within one minute after being stretched at room temperature to twice its length and held one minute before release. The composition was to contain 11.7% by weight of units derived from acid radical (XII). The melting point of the di-n-butyl ester of the diacid based on radical (XII) was 237.9° C. The size of the group —X— as measured with the carboxyl groups cis to one another was 19.4 Angstroms.

EXAMPLE 35

In this example, 29.0 g of an approximately 80/20 mixture by weight of dimethyl glutarate and dimethyl adipate, 7.04 g of the dibutyl ester of diacid radical (XIII) identified above, 20.1 g 1,4-butanediol and 0.15 g antioxidant were mixed at room temperature after which 1.5 cc of a 5% solution of tetrabutyltitanate in ethylene glycol was added. After stirring for 45 min. at 210° C., the mixture was polymerized substantially as described in Example 4.

The resultant polymer was colorless and retracted to less than 1.5 times its original length within one minute after being stretched at room temperature to twice its length and held one minute before release. The composition was calculated to contain 11.4% by weight of units —X— derived from acid radical (XIII). The melting point of the di-n-butyl ester of the diacid based on radical (XIII) was 237.3° C. The size of the group —X— as measured with the carboxyl groups cis to one another was 15.1 Angstroms.

EXAMPLE 36

In this example, all of the reactants are added in one step. The aliphatic diacids are added in the form of the free diacids, and the initial part of the reaction is run at a temperature low enough that the solid aliphatic diacid(s) do not substantially dissolve.

In this example, 22.2 g of a distilled 26/59/12 by weight mixture of succinic glutaric, and adipic acids, respectively, 4.78 g trimellitic anhydride, 1.42 g p-phenylenediamine, 23.5 g of NPG, 0.15 g of AO 330, and one cc of a 1% solution of antimony trioxide in ethylene glycol were stirred for 22 min at approximately 70° C. while suspended over a Woods metal bath at 297° C., during which time the acid mixture (in the form of flakes) did not appear to substantially dissolve. The reaction vessel was immersed in the bath. After 80 min the dispersion became a clear solution. This clear solution was then stirred a further 8 min and the temperature dropped to 275° C., after which the melt was polymerized substantially as described in Example 3.

The resultant tough elastomer had an inherent viscosity of 0.94 in m-cresol. A DSC (after extraction with acetone) showed a Tg of −19.6° and mp of 128.9° C. The composition was calculated to contain 11.4% of units —X— derived from p-phenylene-bis-(N-trimellitimide).

EXAMPLE 37

In this example, all of the reactants are added in one step with the aliphatic diacid(s) being added in the form of their dialkyl ester(s).

34.4 g of an 29/71 by weight mixture of the dimethyl esters of glutaric and adipic acids, respectively, 4.7 g trimellitic anhydride, 1.4 g p-phenylenediamine, 19 g of ethylene glycol, 0.2 g of AO 330, and 0.75 cc of a 5% solution of TBT in ethylene glycol were stirred for 45 min at 212° C., after which the reaction temperature was raised to 273° C. over a period of 30 min, after which the dispersion became a clear solution. This clear solution was then polymerized at 250° C. substantially as described in Example 3.

The resultant tough elastomer had an inherent viscosity of 0.80 in m-cresol. A DSC (after extraction with acetone) showed a Tg of −28.8° C. and a broad melting point with the minimum of the endotherm at 140.5 composition was calculated to contain 11.4% of units —X— derived from p-phenylene-N,N'-bis-trimellitimide. A film cast from DMAC and dried under vacuum and nitrogen at 110° C. had T/E of 0.071/835 and a set of 23.3% after extending 5 times to 300%.

EXAMPLE 38

Another process for preparing the polymers of the invention involves first forming a slurry of the precursors of the high molecular weight diacid hard segment and one or more diols providing units of the soft segment and then adding a catalyst and one or more diacids providing units of the soft segment. The mixture is heated to form the prepolymer and then taken to high molecular weight. Preferably the slurry is formed at room temperature. A solvent for the diols can be added to facilitate formation of the slurry. This is of particular advantage when dealing with diols which are not liquid at room temperature.

Into a 350 ml resin kettle equipped with a mechanical stirrer, a nitrogen inlet port, distillation column, and Wood's metal bath was placed 9.6 g of trimellitic anhydride, 2.7 g of para-phenylenediamine, 20 g of ethylene glycol and 20 g of 1,4-butanediol. The contents of the kettle were rapidly stirred under a nitrogen atmosphere at room temperature for ~45 minutes. After that time, a thick yellow slurry had developed indicating the formation of the high molecular weight acid hard segment and/or its intermediates. To the slurry was then added 49.4 g of adipic acid, 0.4 g of an antioxidant (Ethyl Antioxidant 330), and 3.5 ml of a 1% (wt) solution of antimony trioxide in ethylene glycol. The kettle was again purged with nitrogen and lowered into a Wood's metal bath heated to 220° C. The slurry was stirred rapidly at this temperature for 45 minutes. The temperature was then raised to 260°-285° C. and the mixture was rapidly stirred at this temperature for 1¾ hours. The temperature was then held at 265° C., and the kettle was slowly evacuated over the course of 1½ hours to ~0.5 mm Hg pressure. The polymer was then stirred at 265° C. and 0.5–0.25 mm Hg pressure until a very viscous polymer melt was observed (15 minutes). The molten polymer was then removed from the kettle to give 58.5 g of product.

A DSC of the resultant tough elastomer showed a Tg of −47.7° C. The inherent viscosity was 1.89 (hexafluoroisopropanol).

We claim:
1. An elastomer consisting essentially of
   A. from about 5 to 25 wt. % of —X— units where —X— is part of a repeat unit having the structural formula

—Y—X—Z— where —Y— and —Z— are independently selected from —O—,

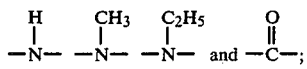

—X— is a divalent organic radical consisting of a chain of ring structures except for trans-amide, carbonyl, trans-vinylene, azo, and azomethine linkages which may be present and whose shortest length between centers of its terminal junctions measured from a Dreiding model laid flat is at least 11 Angstroms; and when —X— is in the compound:

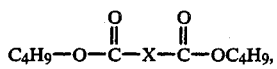

the compound exhibits a melting point that is at least about 225° C.; and

B. from about 75 to 95 wt. % of units selected from the following:

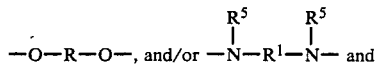

a.

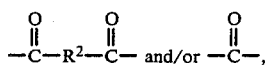

b.

in which both free bonds are connected to oxygen and/or nitrogen, and/or

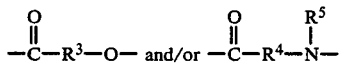

c.

where R, $R^1$, $R^2$, $R^3$ and $R^4$ are each aliphatic divalent organic radicals, having from 2 to 15 carbon atoms within the chain, with each having a molecular weight of under 450 and $R^5$ is a hydrocarbon radical.

2. An elastomer according to claim 1 wherein R, $R^1$, $R^2$, $R^3$, and $R^4$ are each saturated hydrocarbon radicals.

3. An elastomer according to claim 1 wherein —Y—X—Z— is selected from the group of

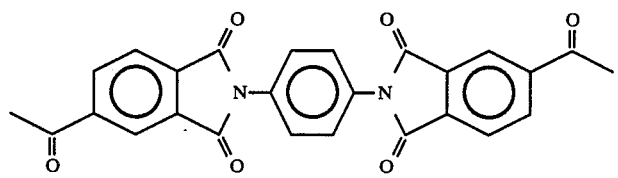

(I)

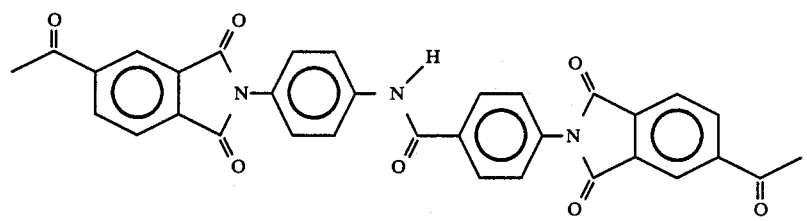

(II)

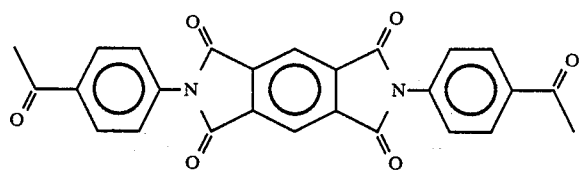

(III)

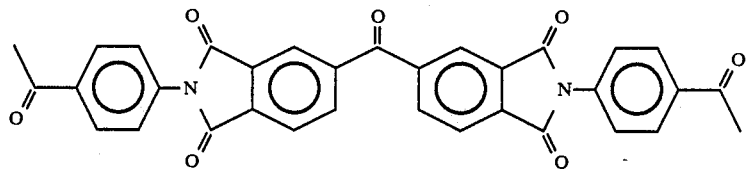

(IV)

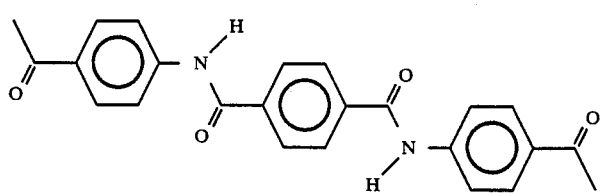

(V)

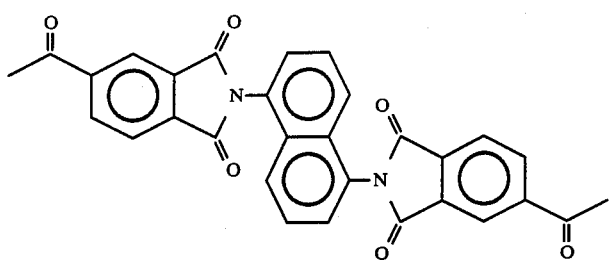
(VI)
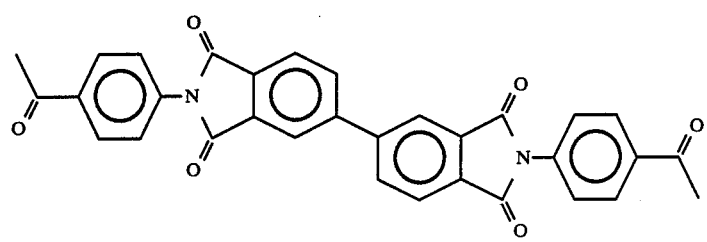
(VIII)
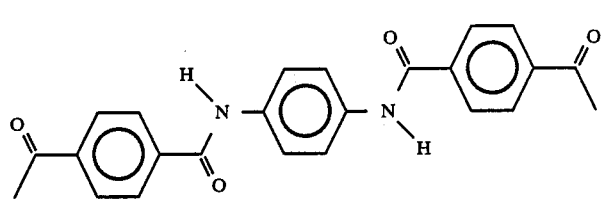
(VIII)
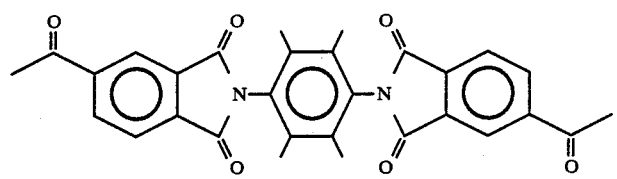
(IX)
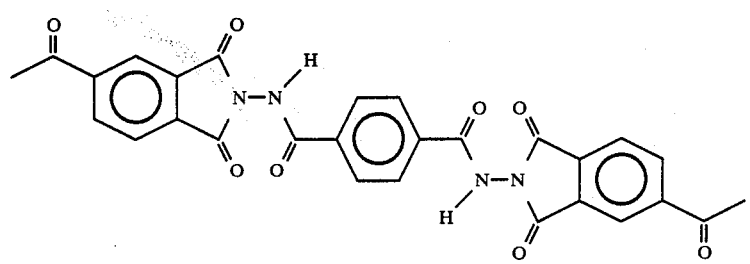
(X)
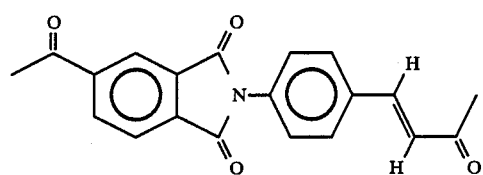
(XI)
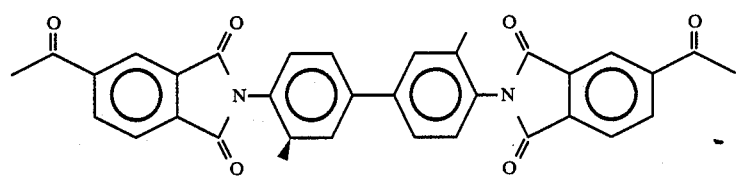
(XII)

-continued

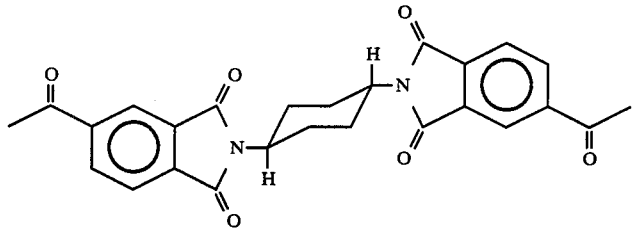

(XIII)

4. An elastomer according to claims 1 or 3 wherein the b. units are

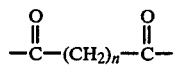

wherein n is at least 7.

5. An elastomer according to claim 4 wherein the a. units are

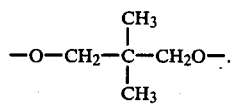

6. An elastomer according to claim 4 wherein the a. units are

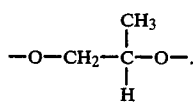

7. An elastomer according to claim 4 wherein the a. units are

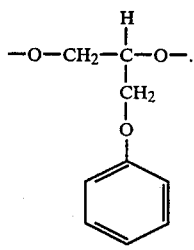

8. An elastomer according to claims 1 or 3 wherein the b. units are

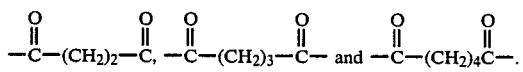

9. An elastomer according to claims 1 or 3 wherein the b. units are

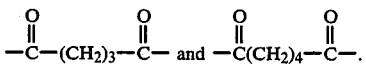

10. A fiber, film or molded article of the elastomer of claims 1 or 3.

11. A method of improving the tenacity and set of fibers or films from the elastomers of claim 1 comprising heating the fibers or films for at least two hours at a temperature of at least 150° C. under an inert atmosphere.

12. A process for preparing an elastomer of claim 1 which comprises heating a high molecular weight diacid of the formula

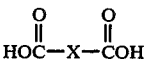

where —X— is as defined in claim 1 with one or more diols and diacids providing units a. and b. of claim 1, said diols being in excess of stoichiometry at a temperature of about 220° to 300° C. and in the presence of an esterification catalyst to form prepolymer and carrying the resulting prepolymer to high molecular weight.

13. A process according to claim 12 wherein the high molecular weight diacid is p-phenylene-bis-(N-trimellitimide).

14. A process according to claim 12 wherein the high molecular weight diacid is first formed as a slurry in one or more esters of diacids providing unit b. after which catalyst and one or more of the diols providing unit a. are added and the mixture heated to form the prepolymer.

15. A process according to claim 12 wherein the precursors of high molecular weight diacid, the diols and diacids providing units a. and b. or the dimethyl esters thereof and the esterification catalyst are combined in one step and heated to form the prepolymer.

16. A process for preparing an elastomer of claim 1 wherein the precursors of the high molecular weight diacid and one or more diols providing unit a. are first formed into a slurry after which a catalyst and one or more diacids providing unit b. are added and the mixture is heated to form the prepolymer and then taken to high molecular weight.

17. A process according to claim 16 wherein the slurry formation is carried out at room temperature.

* * * * *